Jan. 3, 1967 E. W. DEZIEL 3,295,977
PHOTOLITHOGRAPHIC PLATE HAVING A COMPOSITE BACKING
Filed March 17, 1966
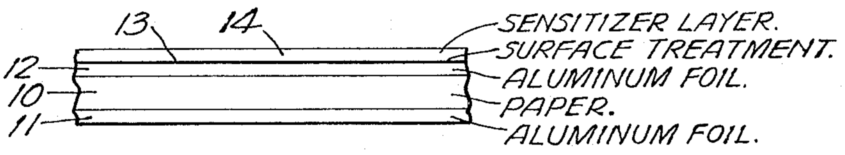
INVENTOR.
EDWARD W. DEZIEL
BY
Carpenter, Kinney & Coulter
ATTORNEYS 3,295,977

PHOTOLITHOGRAPHIC PLATE HAVING A COMPOSITE BACKING

Edward W. Deziel, Bloomington, Minn., assignor to Minnesota Mining and Manufacturing Company, St. Paul, Minn., a corporation of Delaware Filed Mar. 17, 1966, Ser. No. 535,196
4 Claims. (Cl. 96—75)

This application is a continuation-in-part of abandoned application Serial No. 385,028, filed July 24, 1964, which is a continuation-in-part of abandoned application Serial No. 783,904, filed December 30, 1958.

The present invention relates to lithographic printing, and more particularly to a novel sensitized printing plate for photolithography, characterized by a laminar composite backing including a pliable, non-resilient metal and a suitably conformable non-metal material such as paper.

In photolithography, it is often desirable to expose a single large photolithographic plate simultaneously to a number of smaller sized image bearing transparencies, e.g. "negatives." A masking media in the form of an opaque paper sheet approximately the size of the plate (referred to in the industry as a "flat") is provided with cut-out portions or windows, the negatives are mounted to the flat over the windows, and the plate is placed against the "flat" and exposed. The flat thus functions to fix the position of the negatives and to prevent exposure of any portion of the plate other than through the negatives.

If there is any separation between the plate and the negative, the light being directed through the negative and onto the plate can spread and cause a blurring of the image formed on the plate. It is thus necessary for preventing such blurring that the plate and negative have intimate contact throughout the area of exposure. Such exposure is thus generally accomplished within a vacuum frame which draws the plate and negatives (including the flat) together. However, whereas the negative is highly flexible and is thus drawn into the window of the flat, the resilient metal backed printing plates used prior to my invention are not easily drawn into the windows and will not conform to the edges of the windows, and a spacing between the negative and the plate occurs at said edges. This results in an undesirable blurring of the image at said edges and is referred to in the industry as "halation."

The present invention effectively reduces the effects of halation by providing a lithographic plate having a backing comprised of a yieldable composite structure that can be drawn by the vacuum frame into the window of the masking media and thereby achieve the desired intimate contact with the negative throughout the area of exposure. In general, the backing sheet of the plate is constructed of a non-metal, highly conformable and yieldable base layer having a thin pliable non-resilient metal foil bonded to one face or surface and a metal foil or other water-impervious surfacing bonded to the other or back surface of the base layer. The metal foil provides the necessary foundation to be treated and thereover to receive the light-sensitive materials that make the plate suitable for photolithography, whereas the water impervious layer protects the base layer from liquids, particularly during the process wherein the metal foil is coated with the light-sensitive materials. The conformable base layer of my plate structure functions, when the plate is pressed against the masking media during exposure thereof within the vacuum frame, to urge the thin pliable non-resilient metal foil into the windows. The foil thus cooperates with the flexible negative in establishing the intimate contact necessary to reduce halation. Halation, although occurring in all sizes of all-metal photolithographic plates where a masking media is employed, is particularly evident in the larger all-metal plates, i.e. plates of a size greater than letter size and in excess of about 17" by 22". Consequently, the plate structure of the present invention is particularly adapted for use in the larger photolithographic plates, in excess of 300 square inches in size, and especially those in excess of 500 or 600 square inches in size, e.g. commercial plates 36¾" x 30¼", 32" x 41", 40" x 48" and 47¼" x 60", for example.

I am aware that, outside of the field of photolithography, composite sheeting, including metal laminated to paper, has been employed for a variety of uses. Among these uses are photography (see, for example, Taton French Patent 472,222 of 1914) and direct image plates, where a message is typed directly on a letter size plate. It has been suggested, for such use, to employ a thin metal film over paper thereby to reduce the springiness of the plate and allow conventional typewriter paper holders to hold the plate against the typewriter platen, to avoid embossing the metal film with the typewriter keys. Osborn U.S. Patent No. 2,048,964, granted July 28, 1936, on an application filed July 5, 1934, contains such disclosure, but does not employ a sensitizer and does not concern photolithography or any of its special problems, e.g. halation, discussed above. Note, for example, that Osborn avoids the use of a very soft (non-resilient) metal as a solution to the problem caused by the plates' springiness. The soft metal is inherently deformable and becomes impressed by the striking typewriter keys. Thus Osborn reduces springiness while maintaining hardness by reducing the thickness of the hard resilient metal and backing it with a dense non-resilient paper. The importance placed on maintaining hardness is evident from the Osborn disclosure wherein it is pointed out that even a change from one metal to another that has very similar properties of hardness (i.e. zinc to aluminum) requires that the density of the paper backing be increased to balance off the difference in hardness between the metals.

No one heretofore, insofar as I am aware, ever suggested the combination of a yieldable composite sheeting of a soft non-resilient metal layer laminated to a conformable and yieldable non-metal backing, with a light-sensitive material, or with a barrier coat followed by a diazo light-sensitive material coated over the metal surface, to accomplish the elimination or minimization of halation in photolithography. As above indicated, this problem is encountered especially in the larger size plates, i.e. beyond the letter size.

In connection with the specific field of photolithography, I am aware of the basic contribution of the Jewett and Case Patent No. 2,714,066, granted July 26, 1955, on an application originally filed December 6, 1950, and I am also aware of the earlier suggestion in the Kalle French Patent No. 904,255 to coat diazo directly over an aluminum sheet with or without a porous coating of phosphorus, alumina or the like. No one heretofore, however, insofar as I am aware, ever recognized or suggested that the metal backings of Jewett and Case, or of Kalle, could be replaced, and with advantage, by the use of a thin pliable non-resilient metal film over a yieldable base such as paper, as herein described. For example, none of those people, engaged for years in trying to advance the art of photolithography, recognized that the halation effect encountered to varying degrees with all-metal plates in photolithography, could be greatly minimized by employing the plates which I devised, and which are herein described.

It is therefore an object of the present invention to provide an inexpensive yet effective photolithographic printing plate which is commercially competitive with, and which obviates many of the disadvantages of conventional photolithographic printing plates. A further object of the present invention is to provide a photolithographic printing plate having a novel backing construction which obviates halation resulting from inadequate contact between the plate and a negative or stencil within an exposure area defined by a masking media.

The manner in which these and other objects and advantages are obtained will be apparent from the following description of the invention, including the accompanying drawing wherein the figure is an edge-on view of a preferred embodiment of our novel plate construction. Dimensions in the drawing are exaggerated for purposes of clarity.

In preferred form, the plate structures hereof contain a doubly laminated paper-aluminum composite backing construction. In such construction, a paper interlayer 10 is utilized, which can be, for example, a high wet-strength natural kraft paper. Laminated to both surfaces of paper interlayer 10 are thin foils 11 and 12, respectively, of aluminum. The composite backing has a thickness ranging from about 5–12 mils; and, for the larger size plates is preferably from about 8 to 12 mils, or so. Of the total, the combined thickness of foils 11 and 12 is substantially less than that of paper interlayer 10; and, in the larger size plates, the foil on one side of the paper or equivalent may preferably be less than 1/10 the thickness of that paper. For example, for a paper about 7 mils thick, an aluminum foil on one side may be ½ mil thick, or less than 10 percent of the thickness of the paper.

The foils 11 and 12 can be firmly adhered to interlayer 10 with any suitable waterproof adhesive such as a water dispersed casein-containing polychloroprene based rubbery adhesive.

A preferred aluminum foil is a 99.45 percent aluminum alloy standardized as "1145," although other alloys such as standardized "3003" (containing 1.0–1.5 percent manganese), or "1100" (commercially pure aluminum containing a minimum of 99.0 percent aluminum), or "5005" (containing 0.75 percent magnesium) or other alloys of aluminum can be used, so long as they are suitable for rolling into thin foils. The aluminum foil is preferably used in the annealed temper, i.e., standardized "type-0." In the annealed temper the aluminum is "dead soft" and essentially non-resilient. It is highly conformable and enables the backing sheet to readily conform under the pressures of a vacuum frame to the window edges of a "flat."

When thin aluminum foils having one bright mill finish side and a second "pack roll" finish side (which is somewhat dull compared with the mill finish) are employed, the foil is preferably laminated "pack roll" finish side out. A visually more pleasing surface is thus provided after the plate has been exposed once the image is visually developed.

The backing construction is first prepared for the application of the sensitizer by cleaning and degreasing one or both of the exterior aluminum surfaces. This can be accomplished, for example, by treating with trisodium phosphate followed by a treatment of concentrated nitric acid or as described in detail in Jewett and Case Patent No. 2,714,066, granted July 26, 1955. At least one surface of the aluminum, thus cleaned, is then provided with a surface treatment 13 over which is coated a thin layer 14 of a light-sensitive diazo resin, e.g., an initially water-soluble diazo resin which, upon exposure to actinic light, insolubilizes to a water-insoluble permanently organophilic character. Said treated surface 13 is receptive to tenaciously holding the in situ light-reacted light-sensitive material, while serving also as a barrier interposed between the sensitizer layer 14 so as to prevent the latter from degradation by the metal during storage, prior to exposure and use. Said treated surface 13 can be obtained from treating the aluminum surface with an aqueous alkali silicate solution, the surface being washed free of water-soluble materials, all as described in the aforementioned Jewett and Case Patent No. 2,714,066; or said treated surface 13 can be otherwise produced, e.g., as disclosed in the Dowdall and Case Patent No. 3,136,-636, granted June 9, 1964. The sensitizer preferably is the water-soluble light-reactive diazo resin prepared from paradiazodiphenylamine and formaldehyde described in said Jewett and Case patent.

To be used, the plate is first exposed to actinic light through a negative transparency or stencil to insolubilize the light-sensitive coating in the light-struck areas. Then, under subdued light, the plate is washed with water and lightly rubbed to remove the remaining soluble portions of the sensitizer coating, thereby to bare the permanently hydrophilic silicate-treated aluminum in the non-image areas. The plate in this form is ready to be put on the press. However, if desired, the image can be rendered more durable through the addition of an abrasion-resistant coating thereto, for example, as described in Hall Patent No. 2,754,279.

Various advantages reside in the plate structures hereof. For example, the backing composite (especially when continuously produced in commercial quantities) is nearly as inexpensive as a paper backing of appropriate weight. The plates hereof are dimensionally stable. Press life greatly exceeds a corresponding paper backed construction. Even though the backing is composed mostly of paper, difficulties such as curling, wrinkling and stretching of the plate, prevalent with conventional paper-backed photolithographic plates when they encounter water and other liquids during processing and on the press, are avoided. The plate structures hereof thus exhibit highly desirable qualities of metal backed printing plates, while avoiding some of their problems. At the same time, certain desirable features inhering in paper-backed photolithographic plates exist. For instance, as above set forth, it has been found that the resilient and conformable lamina or paper interlayer of my photolithographic plate structure acts as a very effective anti-halation cushion.

Where only one side of the plate is to be used for printing, the back of the plate may have a surfacing of a thin metal foil or other suitable barrier layer or backsize, e.g., a coating of polyethylene, in a weight of about 10 to 15 pounds per ream of 500 sheets 24" x 36" in size.

Although in the drawing and in the foregoing description, only one of the foils of the backing composite was treated and sensitized, both foils can be treated and sensitized to provide a presensitized printing plate, both surfaces of which can be used for printing. In this event each plate construction can effectively be utilized as "two plates." Where both foils are sensitized, the same weight of aluminum preferably is employed for both foils. However, where only one foil is to be sensitized, the opposite foil can be much lighter, or can be replaced by other water-resistant coating or surfacing, in that such primarily functions as an impervious covering to protect the paper from liquids.

Backing weight can vary substantially. Preferably the paper interlayer has a basis weight of from about 40–130 pounds per ream of 500 24" x 36" sheets; and nominal thickness of the aluminum foils ranges from about 0.35 to 2.5 mils, e.g., 0.5 mil. Ordinarily, in plates of a size used on conventional office duplicating presses, e.g., 10" x 16" plates, weights of paper and thicknesses of aluminum are used in the lower to intermediate ranges. For example, the backing of a preferred commercial 10" x 16" duplicating plate hereof, sensitized on both surfaces, contains a 0.5 mil aluminum foil laminated ("pack roll" finish side out) to each surface of a high wet-strength natural kraft interlayer having a basis weight of about 50 to 65 pounds per ream of 500 24" x 36" sheets. On the other hand, in the case of larger size plates, heavier weights of paper are often employed to give the plate preferred lithographic characteristics and handling qualities. For example, a commercial plate 15½" x 20½", or 27¼" x 28⅝", or 29½" x 38¼" may desirably have an overall thickness of about 7 to 9 mils, e.g., 8 mils, with a ½ mil aluminum foil laminated to each side of a paper about 7 mils thick and having a basis weight of about 100 to 110, e.g., 105, pounds per ream of 500 24" x 36" sheets.

This invention concerns both negative-acting and positive-acting photolithographic plates, in each of which the lithographer is concerned with exposing the plate through a stencil or an image-containing transparency in a vacuum frame or the like.

What is claimed is:

1. A sensitized, dimensionally stable plate suitable for photolithographic printing wherein a masking media is employed to determine the exposure areas, comprising in combination (a) a composite backing sheet, said backing sheet including a thin pliable annealed temper metal foil firmly bonded to one face of a yieldable conformable base layer and a water resistant surfacing bonded to the opposite face of said base layer, said composite backing being of a thickness ranging from about 5 to 12 mils, and said base layer having a thickness substantially greater than the thickness of the metal foil, (b) the exposed surface of said metal foil having an isolating and bonding surface treatment, and (c) over and in contact with said surface treatment on said metal foil a thin coating of a light-sensitive material, said composite backing sheet during exposure of the plate within a vacuum frame, conforming to the windows of the masking media to facilitate intimate contact between the stencil or image-carrying transparency and the metal foil throughout the open areas of said windows to thereby effectively reduce halation.

2. A sensitized, dimensionally stable plate suitable for photolithographic printing wherein a masking media is employed to determine the exposure areas, comprising in combination (a) a composite backing sheet, said backing sheet including a thin, pliable non-resilient, annealed temper dead-soft aluminum foil firmly bonded to one face of a yieldable conformable base layer, and water resistant barrier layer bonded to the opposite face of said base layer, said composite being of a thickness ranging from about 5 to 12 mils, and said base layer having a thickness substantially greater than the thickness of the aluminum foil, (b) the exposed surface of said metal foil having an isolating and bonding surface treatment, and (c) over and in contact with said surface treatment on said metal foil a thin coating of a light-sensitive material, said composite backing sheet during exposure of the plate within a vacuum frame, and as a result of vacuum pressures applied within the frame fully conforming around the edges of the windows of the masking media to facilitate intimate contact between the stencil or image-carrying transparency and the metal foil throughout the open areas of said windows to thereby effectively reduce halation.

3. A presensitized, dimensionally stable plate of a size greater than letter size and in excess of 300 square inches and suitable for photolithographic printing wherein a masking media is employed to determine the exposure areas comprising in combination (a) a composite backing sheet, said backing sheet including a unified laminate of two thin annealed temper aluminum foils, of the order of ½ mil in thickness, firmly bonded to opposite surfaces of a conformable paper sheet which is at least about 10 times the thickness of one of said foils and which forms an interlayer between said foils, said composite backing being of a thickness of the order of about 8 to 12 mils and the said paper sheet having a thickness of at least five times the combined thickness of the aluminum foils, (b) the exposed surface of said one of said aluminum foils having a water-insoluble hydrophilic isolating and bonding surface treatment characterized in that it will cause an in situ insolubilized diazo resin strongly to adhere to said exposed surface, and (c) over and in contact with the treated surface of said aluminum foil a thin coating of a light-sensitive diazo resin, said light-sensitive material being characterized in that, upon exposure of the plate to ultraviolet light through a stencil or negative, it will react in the exposed portions, forming a water-insoluble, hydrophobic and organophilic material which is tightly bonded to said treated surface, said composite backing sheet, during exposure of the plate within a vacuum frame, conforming to the windows of the masking media to facilitate intimate contact between the stencil or negative and the aluminum foil throughout the open areas of said windows to thereby effectively reduce halation.

4. The method of making a presensitized, dimensionally stable photolithographic printing plate which is effective in reducing halation during exposure of the plate to actinic light through a stencil or negative in a vacuum frame, which comprises (a) laminating a thin pliable annealed temper aluminum foil of the order of .5 mil thickness to a relatively thick yieldable conformable paper base layer and applying an aluminum surfacing to the opposite face or surface of said base layer; (b) treating the exposed surface of said aluminum foil so as to produce a water-insoluble hydrophilic isolating and bonding surface treatment which will serve to protect the light-sensitive diazo resin from decomposition by the aluminum during storage, and will cause an in situ insolubilized diazo resin strongly to adhere thereto; and (c) over and in contact with said surface treatment on said aluminum foil, applying a thin coating of a light-sensitive diazo resin.

No references cited.

NORMAN G. TORCHIN, *Primary Examiner.*

A. D. RICCI, *Examiner.*